June 25, 1963  J. P. FRANCIS  3,095,034
RETRACTABLE WINDSHIELD AWNING
Filed Jan. 3, 1962

INVENTOR
John P. Francis

United States Patent Office 3,095,034
Patented June 25, 1963

3,095,034
RETRACTABLE WINDSHIELD AWNING
John P. Francis, 20 Boston St., Haverhill, Mass.
Filed Jan. 3, 1962, Ser. No. 165,061
5 Claims. (Cl. 160—364)

This invention relates to improvements in automobile windshield awnings and the supporting means for supporting the said awning, an object thereof being to provide a simple, and an improved awning structure adapted to engage the exterior lateral portion of the roof top of an automobile, in either spaced apart relationship or in frictional engagement with the said roof top.

Another object thereof is to provide a permanent, semipermanent, or a temporary and removable collapsible supporting structure for adjustably supporting a coiled roller supported awning for longitudinally movable taut supported adjustment from the said roller.

A still further and important object thereof is to provide protection to the windshield area from rain, sleet, snow, or the formation of ice thereon, and to provide clean and clear visibility for proper vision at all times when viewing outdoor movies at drive-in theatres and other outdoor events, thus eliminating the continuous or the on and off use of the windshield wipers.

With these objects and still others in view, as will hereinafter more fully appear, the invention comprises certain novel constructions, combinations, and arrangement of parts, hereinafter described and claimed and illustrated in the accompanying drawings, in which:

Figure 1:
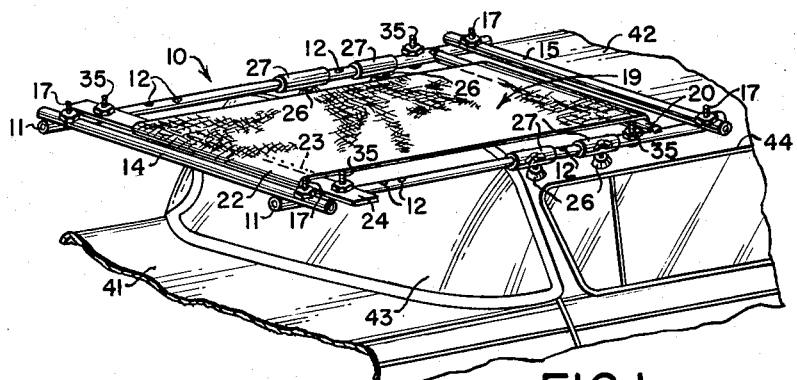
FIGURE 1 is a perspective view, in fragment, of the front portion of an automobile, the view including a perspective view of the adjustable awning and supporting structure therefor.
Figure 2:
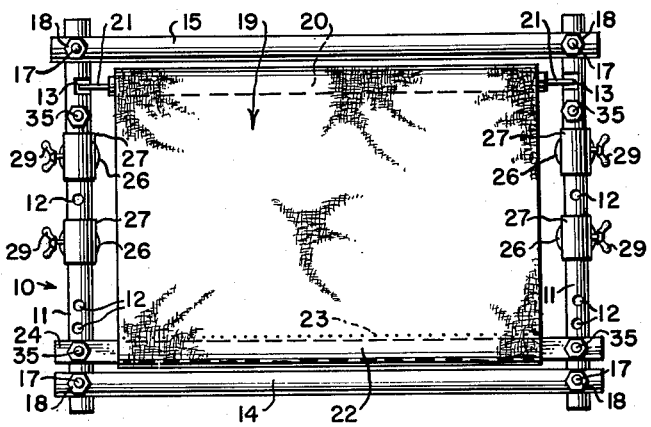
FIGURE 2 is a top plan view of the longitudinally adjustable awning, shown fully extended and adjustably supported to the longitudinal frame members.

Referring now more specifically to the drawings, attention is directed to FIGURES 1 and 2, wherein numeral 10 generally indicates the frame structure, and numeral 19 generally indicates the awning structure.

In FIGURE 1, a portion of an automobile 41 is shown, the awning structure 19 being adjustably supported onto the frame structure 10 supported above the roof top 42 and over the windshield area 43. The said frame structure 10 is adapted to be supported in either adjustable vertically spaced apart relationship or in frictional engagement with the lateral or longitudinal portion of the said roof top.

In supporting the frame structure 10, roof engaging means in the form of vacuum cups 26, either removably or permanently attached to the roof top 42 at the desired location longitudinally and laterally, is shown. Adjustably attached to each vacuum cup 26 is a vertically disposed threaded stud member 28, FIGURES 1, 2 and 6, having a longitudinal tubular frame supporting member 27 attached and supported to the said threaded stud member 28.

Figure 6:
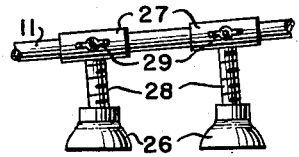
FIGURE 6 is a side elevation view, of a modified form of roof engaging means, also shown in FIGURES 1 and 2.

The longitudinal tubular supporting members 27, as shown in FIGURE 6, and also FIGURES 1 and 2, are preferably used in pairs, to adjustably support each side longitudinal frame member 11, in providing any vertical and longitudinally angular adjustment of the frame structure 10. Upon axial adjustment of the threaded stud members 28, vertical and longitudinally angular adjustment of the frame structure 10 is obtained, as desired. Attached thumb screws 29, are used to adjustably secure the retractable side frame members 11 within the said longitudinal tubular supporting members 27.

A frame and awning structure and a variation of roof engaging means are shown and described in my copending application, Serial No. 70,100, filed November 15, 1960. My invention therefore, is concerned primarily with a modified form of a frame and awning structure.

Figure 3:
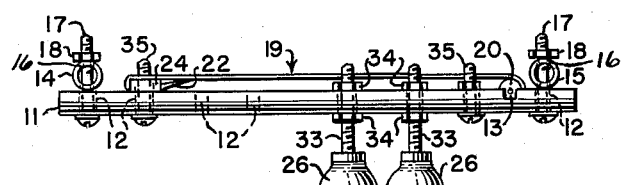
FIGURE 3 is a side elevation view of the fully extended awning, showing a modified form of roof engaging means for adjustably supporting the frame structure.
Figure 4:
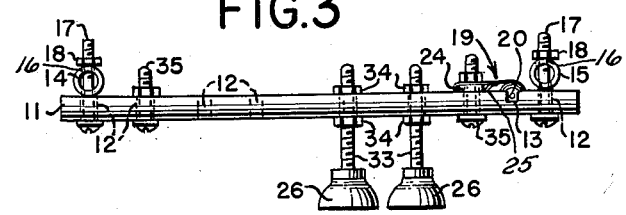
FIGURE 4 is also a side elevation view, of the modified form of FIGURE 3, showing the awning in the fully retracted position.

In FIGURES 3 and 4, there is shown another form of roof engaging means comprising vertical threaded stud members 33 adjustably attached to the vacuum cups 26. Each vertical stud member 33 extends through a preselected vertical aperture 12 formed in each side frame member 11. An upper and lower threaded nut member 34 provides individual adjustable supporting engagement of each stud member 33 to each side frame member 11, whereby vertical and angular adjustment of the frame structure 10 is obtained, and also any longitudinal adjustment of said frame structure 10.

Figure 5:
FIGURE 5 is an end elevation view, of a modified form of roof engaging means, in the form of a magnetized metal base member.

In FIGURE 5, there is shown still another form of roof engaging means comprising a magnetic metal base member 30, which may be used in place of the vacuum cups 26, and having a threaded recess 31. Adjustably attached to the said threaded recess 31 is the removable vertical threaded stud member 32.

Figure 7:
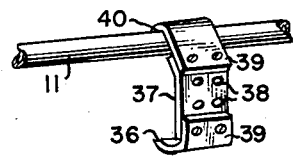
FIGURE 7 is a side elevation view of the clamping members adapted to adjustably engage the longitudinal side frame member and the rain gutter.

In FIGURE 7, another form of a frame structure 10 securing means is shown. The clamping members 36 and 40 may be used in addition to the various types of roof engaging means shown, or the said clamping members 36 and 40 may be used to secure the frame structure 10 directly to the roof top, in friction supporting engagement thereto. The upper clamping member 40 is freely engaged to the longitudinal side frame member 11, said clamping member 40 having a flexible band 37 adjustably attached thereto by threaded bolt members 39, or other suitable fastening means. The flexible band 37 is provided with spaced apart apertures 38, the lower portion of said band 37 adjustably engaging the rain gutter hook 36 by additional bolt members 39. The lower hook member 36 being adapted to engage the rain gutter 44 in adjustably clamping the said side frame member 11 of the frame structure 10 downwardly on said roof top.

Referring back to FIGURE 2, there is shown the frame structure 10, comprising, mainly, the two side spaced apart longitudinal tubular frame members 11. Each side frame member 11 having a number of longitudinally spaced apart vertical apertures 12 formed therethrough. Also included is a vertical recess 13, located on each side frame member 11 at the rear and inside thereof. Adjustably and removably attached, to each side longitudinal frame member 11, is a rear lateral frame member 15 having spaced apart vertical apertures 16 to receive the frame securing bolt 17 and nut 18 fastening members. Adjustably and removably attached, to each side frame member 11, is a forward lateral frame member 14 also having spaced apart vertical apertures 16 to receive the frame securing bolt 17 and nut 18 fastening members. Both of said lateral frame members 14 and 15 also serve as frame securing spreader bars in the prevention of any lateral inward or outward movement of the side longitudinal frame members 11.

The awning structure 19, FIGURES 1 and 2, is a flexible taut supported awning panel supported from a conventional spring actuated window shade roller 20. The awning panel is adapted to be longitudinally adjustable in a longitudinally taut supported form and fully extended from, or retracted to the said roller 20. The engaging ends 21 of the roller 20, engages the vertical recess 13 on each side frame member 11 for instant removable attachment thereto.

The awning panel is provided with a hem 22, formed by the stitches 23 or other suitable means, to receive a preferably rigid lateral awning cross member 24. The said cross member 24 having spaced apart vertical apertures 25 thereon to adjustably receive and engage the threaded bolt members 35, or other threaded members 17 or 33. The said bolt members 35 extending upwardly from the side frame members 11, at or near each end thereof and also therebetween, through the selected apertures 12 of the said side frame members 11.

The frame structure 10 may be supported in adjustable spaced apart relationship relative to the roof top, or in frictional supporting engagement therewith. The vertical height adjustment, or the longitudinally angular adjustment of the frame structure 10 above the roof top; and the longitudinally retractable adjustment, and the adjustable support of the frame structure 10, governs the manner in which the said frame structure 10 may be supported relative to the roof top 42 of the vehicle 41.

To adjustably retract the taut supported awning panel 19, in a taut supported form, first, the awning lateral cross member 24 is removed from the forward vertically disposed bolt members 35. Upon the removal of the lateral cross member 24; which also serves as a securing spreader bar, more so, when one or both lateral frame members 14 and 15 are omitted from the frame structure 10; the spring actuated roller 20 reels in the retracted portion of the awning panel. The removed lateral cross member 24 is then repositioned onto the selected bolt members 35, for the desired taut supported positioning of the awning panel 19.

Since the side longitudinal frame members 11, FIGURES 2, 3 and 4, are provided with a number of longitudinally spaced apart vertical apertures 12, additional bolt members 35 may be added thereto or moved accordingly, thereby providing any longitudinal taut supported adjustment of the taut supported awning panel 19.

In FIGURE 3, the awning panel 19 is shown fully extended from the spring actuated roller 20, with the roller engaging ends 21 seated in the recess 13. The awning panel 19 is adjustably secured, and made longitudinally taut, upon the lateral seating engagement of the lateral cross member 24 to the selected vertical bolt member 35.

In FIGURE 4, the awning panel 19 is shown fully retracted and coiled around the spring actuated roller 20. The lateral cross member 24 is shown repositioned and secured onto the rear bolt member 35 of the side frame member 11. In this position, the roller 20 containing the awning coiled thereon, is easily and quickly removed from the frame structure 10. The frame structure 10 may then be left on the roof top, either permanently, semi-permanently, or removed in whole or in part from the roof top of the vehicle.

The extreme simplicity of the structural and the functional features of the device; the extensive time savings, ease and safety in the permanent, semi-permanent, or temporary erection or removal; and combined with the viewing pleasures and comfort derived therefrom; these objects, all being enjoyed and benefitted by both the management and the patrons during inclement weather conditions, while viewing outdoor movies, or the like.

While certain embodiments of my invention have been disclosed in the foregoing description, it will be understood that various modifications may occur to those skilled in the art. Changes, therefore, in the construction and arrangement, may be made without departing from the spirit and the scope of the invention as disclosed in the appended claims.

I claim:
1. A longitudinally retractable taut supported rain awning panel adjustably supported in said taut supported form over the roof top and the windshield area of an automobile comprising, a frame structure having opposing side spaced apart longitudinal frame members provided with longitudinally spaced apart vertical apertures, longitudinally spaced apart threaded bolt members extending upwardly from the vertical apertures of said side frame members and provided with threaded frame fastening members thereon, a removably attached longitudinally repositionable lateral frame member provided with laterally spaced apart vertical apertures, said longitudinally movable lateral frame member adapted to be clampingly engaged to the selected said vertical bolt and fastening members to adjustably attach and to restrain each side spaced longitudinal frame member from inward or outward lateral movement, a roller supported on the upperside of the outer periphery of and forwardly of the rear end of the said side longitudinal frame members, a longitudinally adjustable awning panel coiled around the said roller for taut supported extensible adjustment therefrom and retractable adjustment thereto, a laterally disposed awning cross member engaged to the free end of said awning panel and provided with laterally spaced apart vertical apertures to adjustably and removably engage the selected said vertically disposed threaded bolt and fastening members to clampingly secure said cross member and to restrain each side longitudinal frame member from individual inward or outward lateral movement independently of and at a spaced distance forwardly or rearwardly of the said repositionable lateral frame member, said longitudinally adjustable taut supported awning panel being partially or fully retractable or extensible in said taut supported form upon the unclamped removal of and the longitudinally movable and clamped attachment of the said lateral awning cross member to the selected said vertical threaded bolt and fastening members, and means for supporting the said frame structure to the roof top.

2. A longitudinally retractable taut supported rain awning panel adjustably supported in said taut supported form over the roof top and the windshield area of an automobile comprising, a frame structure having opposing side spaced apart longitudinal frame members provided with longitudinally spaced apart vertical apertures, longitudinally spaced apart threaded bolt members extending upwardly from the vertical apertures of said side frame members and provided with threaded frame fastening members thereon, a forward and a rear lateral frame member longitudinally movable and repositionable and provided with laterally spaced apart vertical apertures, said longitudinally movable lateral frame members adapted to be clampingly engaged to the selected vertical bolt and fastening members to form an adjustable substantially rectangular shaped frame structure, a roller supported on the upperside of the outer periphery of and forwardly of the rear end of the said side longitudinal frame members, a longitudinally adjustable awning panel coiled around the said roller for taut supported extensible adjustment therefrom and retractable adjustment thereto and movably supported within the said adjustable rectangular shaped frame structure in spaced apart relationship relative to the opposing side longitudinal and both lateral frame members of said frame structure, a laterally disposed awning cross member engaged to the free end of said awning panel and clampingly engaged onto the said side longitudinal frame members, said lateral awning cross member having laterally spaced apart vertical apertures to adjustably and removably engage the selected vertically disposed threaded bolt and fastening members extending above the said side frame members, said longitudinally adjustable taut supported awning panel being partially or fully retractable or extensible in said taut supported form upon the unclamped removal of and the longitudinally movable and clamped attachment of the said lateral awning cross member to the selected said threaded bolt and fastening members, and means for supporting the said frame structure to the roof top.

3. A longitudinally retractable taut supported rain awning panel adjustably supported in said taut supported form over the roof top and the windshield area of an automobile comprising, an adjustably supported frame structure having opposing side spaced apart longitudinal frame members provided with longitudinally spaced apart vertical apertures, longitudinally spaced apart threaded bolt members extending upwardly from the vertical apertures of said side frame members and provided with threaded frame fastening members thereon, a roller supported on the upperside of the outer periphery of and forwardly of the rear end of the said side longitudinal frame members, a longitudinally adjustable awning panel coiled around the said roller for taut supported extensible adjustment therefrom and retractable adjustment thereto, a laterally disposed awning cross member engaged to the free end of said awning panel and provided with laterally spaced apart vertical apertures to adjustably and removably engage the selected said vertically disposed threaded bolt and fastening members to clampingly secure said cross member and to restrain each side longitudinal frame member from individual inward or outward lateral movement, said longitudinally adjustable taut supported awning panel being partially or fully retractable or extensible in said taut supported form upon the unclamped removal of and the longitudinally movable and clamped attachment of the said lateral awning cross member to the selected said vertical threaded bolt and fastening members, and frame supporting means adjustably supporting the removably attached and longitudinally repositionable frame structure in adjustable vertically spaced relation relative to the roof top, said frame supporting means including laterally spaced apart roof engaging means each supporting a vertically disposed threaded stud member, said vertical threaded stud members adjustably engaging the selected threaded vertical apertures of the said side frame members upon the removal of and the longitudinal repositioning of the said side frame members thereto, said vertically disposed threaded stud members adapted to adjustably engage and support the said side longitudinal frame members in providing the said movable supporting adjustments of the said frame structure and attached taut supported awning.

4. A longitudinally retractable taut supported rain awning panel adjustably supported in said taut supported form over the roof top and the windshield area of an automobile comprising, an adjustably supported frame structure having opposing side spaced apart longitudinal frame members provided with longitudinally spaced apart vertical apertures, longitudinally spaced apart threaded bolt members extending upwardly from the vertical apertures of said side frame members and provided with threaded frame fastening members thereon, a roller supported on the upperside of the outer periphery of and forwardly of the rear end of the said side longitudinal frame members, a longitudinally adjustable awning panel coiled around the said roller for taut supported extensible adjustment therefrom and retractable adjustment thereto, a laterally disposed awning cross member engaged to the free end of said awning panel and provided with laterally spaced apart vertical apertures to adjustably and removably engage the selected said vertical disposed threaded bolt and fastening members to clampingly secure said cross member and to restrain each side longitudinal frame member from individual inward or outward lateral movement, said longitudinally adjustable taut supported awning panel being partially or fully retractable or extensible in said taut supported form upon the unclamped removal of and the longitudinally movable and clamped attachment of the said lateral awning cross member to the selected said vertical threaded bolt and fastening members, and frame supporting means adjustably supporting the removably attached and longitudinally repositionable frame structure in adjustable vertically spaced relation relative to the roof top, said frame supporting means including laterally spaced apart roof engaging means each supporting a vertically disposed threaded stud member, said vertical threaded stud members adjustably engaging the selected vertical apertures of the said side frame members upon the removal of and the longitudinal repositioning of the said side frame members thereto, and adjustable threaded frame supporting members on said vertical threaded stud members adapted to adjustably engage and support the said side frame members in providing the said movable supporting adjustments of the said frame structure and attached taut supported awning.

5. A longitudinally retractable taut supported rain awning panel adjustably supported in said taut supported form over the roof top and the windshield area of an automobile comprising, an adjustably supported frame structure having opposing side spaced apart longitudinal frame members provided with longitudinally spaced apart vertical apertures, longitudinally spaced apart threaded bolt members extending upwardly from the vertical apertures of said side frame members and provided with threaded frame fastening members thereon, a roller supported on the upperside of the outer periphery of and forwardly of the rear end of the said side longitudinal frame members, a longitudinally adjustable awning panel coiled around the said roller for taut supported extensible adjustment therefrom and retractable adjustment thereto, a laterally disposed awning cross member engaged to the free end of said awning panel and provided with laterally spaced apart vertical apertures to adjustably and removably engage the selected said vertically disposed threaded bolt and fastening members to clampingly secure said cross member and to restrain each side longitudinal frame member from individual inward or outward lateral movement, said longitudinally adjustable taut supported awning panel being partially or fully retractable or extensible in said taut supported form upon the unclamped removal of and the longitudinally movable and clamped attachment of the said lateral awning cross member to the selected said vertical threaded bolt and fastening members, and frame supporting means adjustably supporting the removably atached and longitudinally repositionable frame structure in a vertically movable or adjustable longitudinally angular spaced apart relationship relative to the roof top, said frame supporting means including laterally and also longitudinally spaced apart roof engaging means each supporting a vertically disposed threaded stud member, said vertical threaded stud members adjustably engaging the selected vertical apertures of the said side frame members upon the removal of and the longitudinal repositioning of the said side frame members thereto, and axially rotatable threaded frame supporting members on each of said vertical threaded stud members freely engaging and adjustably supporting the said side frame members upon the vertically movable axial rotation of either or both of the said spaced apart forward and rear frame supporting members and adapted to provide the said longitudinally, the vertical and the longitudinally angular movable supporting adjustments of the said frame structure and attached taut supported awning.

References Cited in the file of this patent
UNITED STATES PATENTS

| | | |
|---|---|---|
| 1,553,425 | Zumwalt | Sept. 15, 1925 |
| 1,698,871 | Beatty | Jan. 15, 1929 |
| 2,984,300 | Francis | May 16, 1961 |